(No Model.) 3 Sheets—Sheet 1.

T. O. POTTER.
SUSPENDER ATTACHMENT.

No. 322,479. Patented July 21, 1885.

WITNESSES INVENTOR.

(No Model.) 3 Sheets—Sheet 2.

T. O. POTTER.
SUSPENDER ATTACHMENT.

No. 322,479. Patented July 21, 1885.

WITNESSES. INVENTOR.

(No Model.) 3 Sheets—Sheet 3.

T. O. POTTER.
SUSPENDER ATTACHMENT.

No. 322,479. Patented July 21, 1885.

WITNESSES.
J. M. Dolan
Fred. B. Dolan.

INVENTOR.
Thos. O. Potter
by his attys
Clarke & Raymond.

UNITED STATES PATENT OFFICE.

THOMAS O. POTTER, OF BOSTON, MASSACHUSETTS.

SUSPENDER ATTACHMENT.

SPECIFICATION forming part of Letters Patent No. 322,479, dated July 21, 188

Application filed May 1, 1885. (No model.)

*To all whom it may concern:*

Be it known that I, THOMAS O. POTTER, of Boston, in the county of Suffolk and State of Massachusetts, a citizen of the United States, have invented a new and useful Improvement in Devices for Suspending Pantaloons and other Articles of Wearing-Apparel, of which the following is a full, clear, and exact description, reference being had to the accompanying drawings, forming a part of this specification in explaining its nature.

In an application of even date herewith, (Serial No. 164,123,) I have described an improvement in shoulder-braces or suspenders, which includes as an element the specific fastening device herein described; but the same is not specifically claimed therein.

Figures 1, 3, 4:
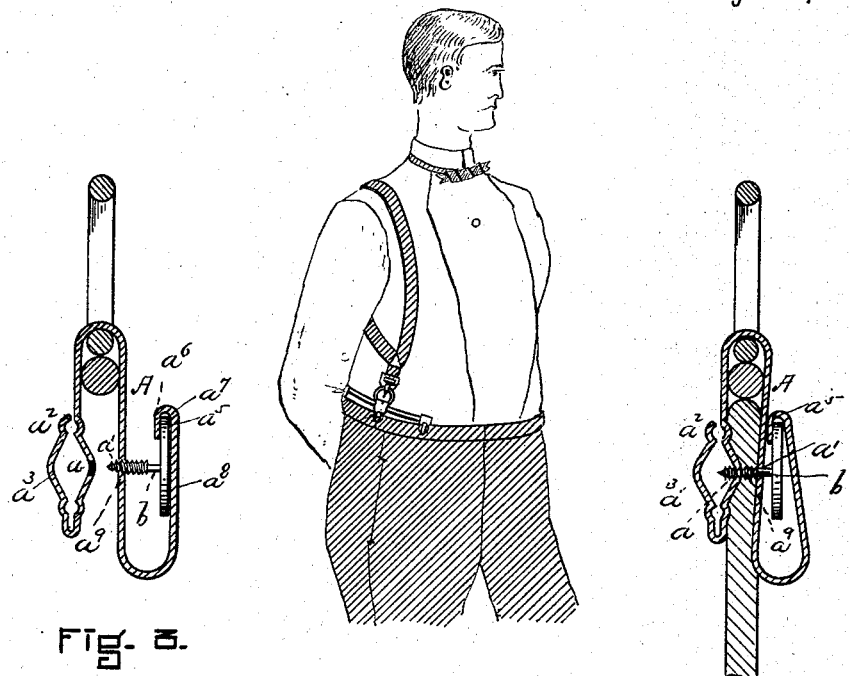
Figure 2:
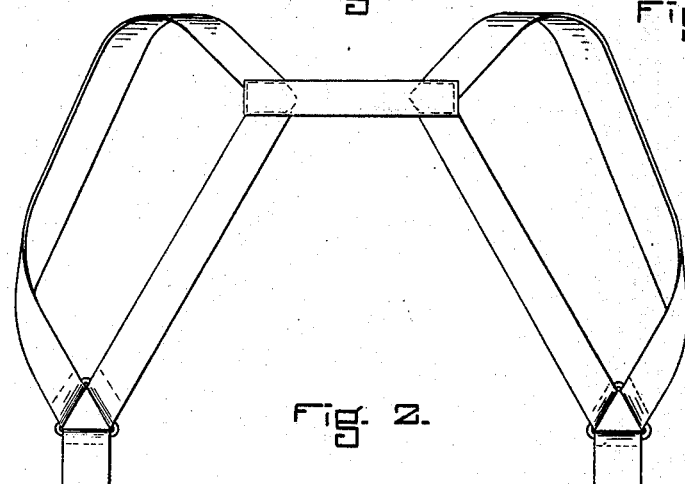
Figure 5:
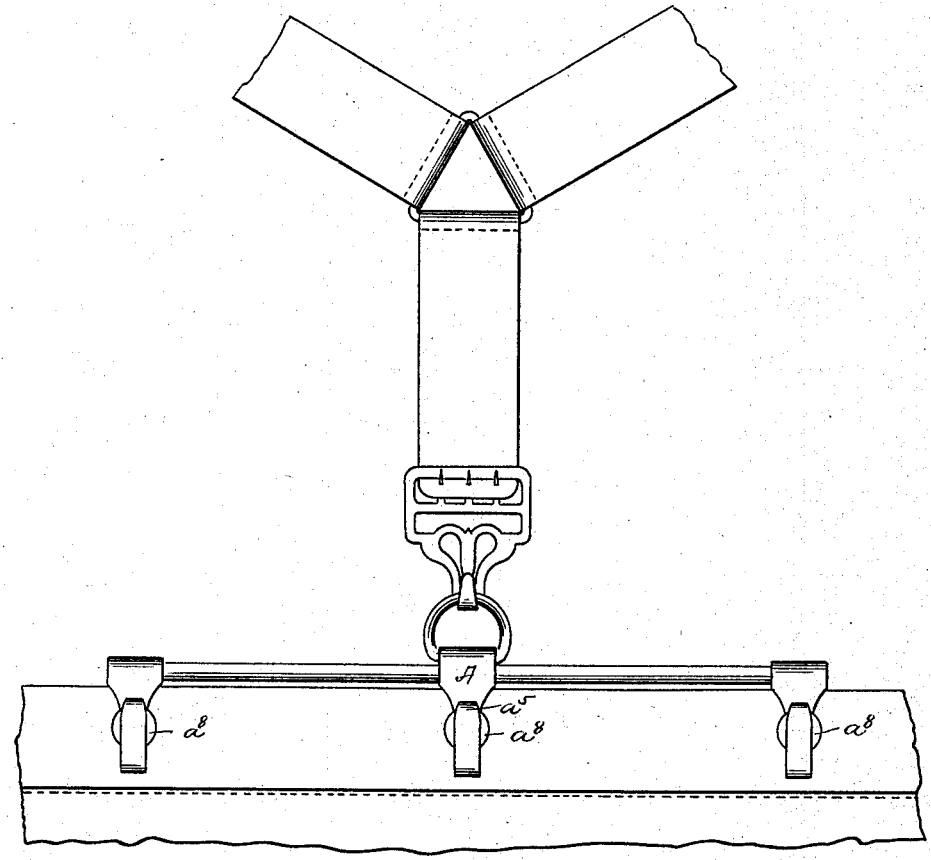
Figure 6:
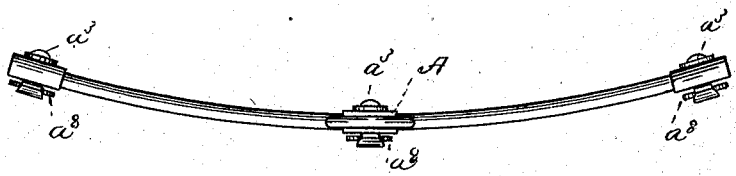
Figure 7:
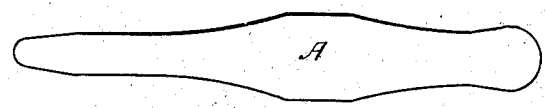
Figure 8:
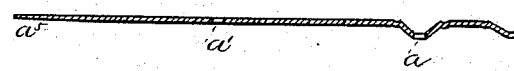
Figure 9:
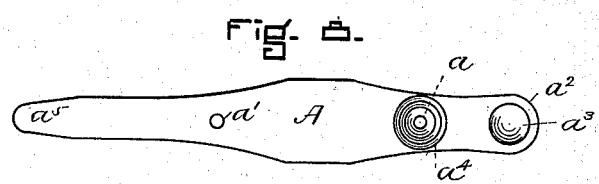
Figure 10:
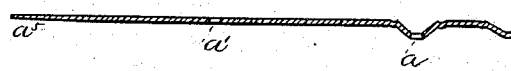
Figure 11:
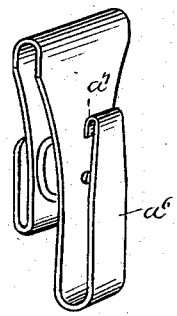
Figure 12:
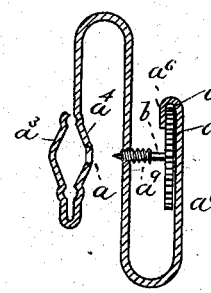
Figure 13:
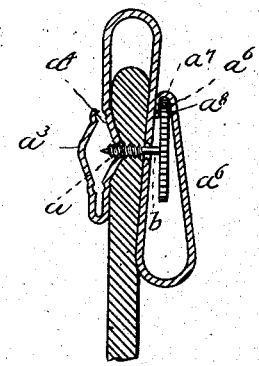

Referring to the drawings, Figure 1 shows the application of my improved fastening to suspenders or braces. Fig. 2 is a rear elevation of suspenders or braces, enlarged, having my improved fastening devices used for securing the waistband of the pantaloons or breeches to the cross-bars. Figs. 3 and 4 are enlarged vertical sections on the line $x\ x$ of Fig. 2, further illustrating the construction and application of the fastening device. Fig. 5 is an enlarged view of a portion of the suspenders or braces and a section of the waistband representing a side elevation of the fastening. Fig. 6 represents a plan view of the fastening attached to the rod, bar, or support. Fig. 7 is a plan view of a blank from which I prefer to form the frame of the fastening. Fig. 8 is a side elevation thereof. Fig. 9 is a view of a blank submitted to a forming operation, which presents at one end two cavities and also two screw holes. Fig. 10 is a vertical central section of this form of blank. Fig. 11 is a perspective view of the fastening-frame without the screw. Fig. 12 is a vertical central section showing the screw and the position which it occupies upon the insertion of the waistband. Fig. 13 represents the vertical section, a waistband secured to the fastening by the screw.

A represents the blank from which the plate is made. It has the screw-holes $a\ a'$ formed therein, and its end $a^2$ is struck up to form the cups $a^3\ a^4$. Its other end, $a^5$, preferably is reduced in width and thinned. The blank thus formed is bent so that the screw-holes $a\ a'$ come opposite each other, as represented in Fig. 12, and the end $a^5$ is bent upward to bring the cap $a^4$ opposite the screw-hole $a'$, while the portion $a^2$ is bent upward and its end $a^6$ downward, so as to form the space $a^7$ within which the head $a^8$ of the screw $a^9$ projects. This return portion or end $a^2$ of the arm forms a spring and moves with the screw in and out from its supporting-plate. The flange $a^6$, closing down beyond the inner edge of the head of the screw, holds it in place, and the strength of the spring is such that when the screw has been screwed out to a considerable extent it bears upon the head of the screw with such force as to show that the screw has been sufficiently turned. The portion of the back plate about the screw-hole $a'$ is made cup-shaped, and extends inward to form a teat and a bearing for the screw as close to the article and to the other bearing as possible.

In use the article to be supported or attached is placed between the two portions of the device, and the screw having been turned outward to permit the insertion is then returned, its point forming a hole in the material, and it is screwed through the same, so that its end enters the screw-hole upon the opposite side.

As it is desirable that the two parts of the arm be drawn as closely together upon the article or thing which they hold as possible, in order to bring the bearings of the screw closely together, and in order to clamp the article or thing between the two plates, I have formed the screw with a screw-thread which does not extend to the head of the screw, but ends at a point sufficiently distant therefrom to enable me to form on the screw-spindle the groove $b$, so that after the screw has been turned so that its head shall come against the outer surface of the plate, its end having entered the screw-hole upon the opposite side it may still be turned and may thereby, by means of the screw-thread, act to draw the two parts of the plate together.

I prefer that the screw have what is known as a "gimlet-point," in order that it may easily enter or pierce the material.

It is obvious that, in lieu of forming the supports or pieces from one plate, as described, they may be formed from two plates, which may be riveted together to their supporting block or rod; also, that the supporting rod or bar may form a part of the suspenders or braces described in my said application, or they may form a portion of any other device for suspending or supporting articles.

Having thus fully described my invention, I claim and desire to secure by Letters Patent of the United States—

1. The combination, in a device for suspending pantaloons or other articles, of a rod or support with arms having screw-holes $a\ a'$ and the screw $a^9$, all substantially as and for the purposes described.

2. The combination of the arm having the screw-hole $a'$, and the spring screw-head-holding flange with the screw $a^9$, all substantially as and for the purposes described.

3. The combination of the arm supporting the screw $a^9$ with the arm having the inward projection $a^4$ and screw-hole formed therein, all substantially as and for the purposes described.

4. The combination of the arm having the screw-hole $a$, and the cap $a^3$, formed by dishing the end of the arm and turning it back upon itself, all substantially as and for the purposes described.

5. The combination of the arms having the screw-holes $a\ a'$, and screw $a^9$, having the groove $b$, all substantially as and for the purposes described.

THOMAS O. POTTER.

Witnesses:
F. F. RAYMOND, 2d,
FRED. B. DOLAN.